(12) United States Patent
Suzuki

(10) Patent No.: US 9,019,575 B2
(45) Date of Patent: Apr. 28, 2015

(54) IMAGE READING APPARATUS AND MULTIFUNCTION PRINTING APPARATUS

(71) Applicant: Canon Kabushiki Kaisha, Tokyo (JP)

(72) Inventor: Yuusuke Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/278,554

(22) Filed: May 15, 2014

(65) Prior Publication Data

US 2014/0355080 A1 Dec. 4, 2014

(30) Foreign Application Priority Data

Jun. 3, 2013 (JP) ................. 2013-117374

(51) Int. Cl.
*H04N 1/04* (2006.01)
*H04N 1/028* (2006.01)

(52) U.S. Cl.
CPC ................. *H04N 1/02815* (2013.01)

(58) Field of Classification Search
USPC ................. 358/475, 474, 498, 497
See application file for complete search history.

(56) References Cited

U.S. PATENT DOCUMENTS

| 8,186,863 B2 * | 5/2012 | Lin et al. .................. 362/555 |
| 2005/0063063 A1 * | 3/2005 | Ashdown .................. 359/599 |
| 2008/0112166 A1 | 5/2008 | Kakizaki et al. .............. 362/245 |

FOREIGN PATENT DOCUMENTS

| JP | 01-181377 | 7/1989 |
| JP | 3217879 B | 10/2001 |
| JP | 2008-123766 | 5/2008 |

* cited by examiner

*Primary Examiner* — Houshang Safaipour
(74) *Attorney, Agent, or Firm* — Fitzpatrick, Cella, Harper & Scinto

(57) ABSTRACT

An embodiment of this invention is directed to reading an original at a high resolution with high quality by an image reading apparatus using a 3-line CCD and white LED. The image reading apparatus according to the embodiment includes a 3-line CCD, a white LED, and a light guide configured to guide light from the LED to an original. A surface of the light guide from which light emerges toward the original is formed into a concave shape. Light from the light guide almost uniformly irradiates the reading region of an image placed on a platen glass.

9 Claims, 7 Drawing Sheets

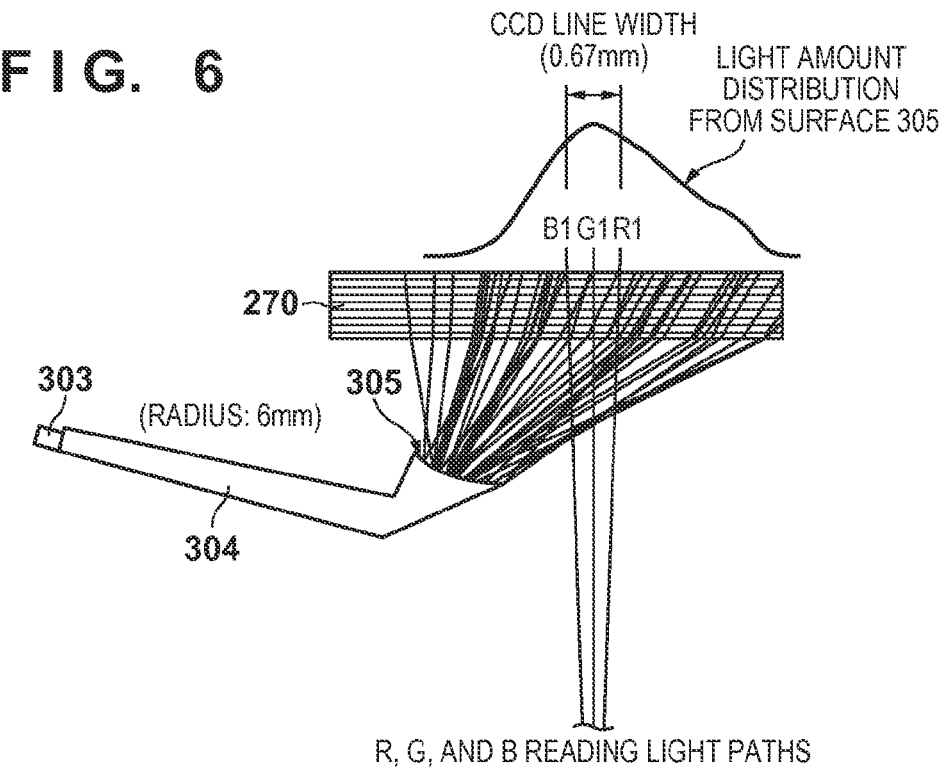
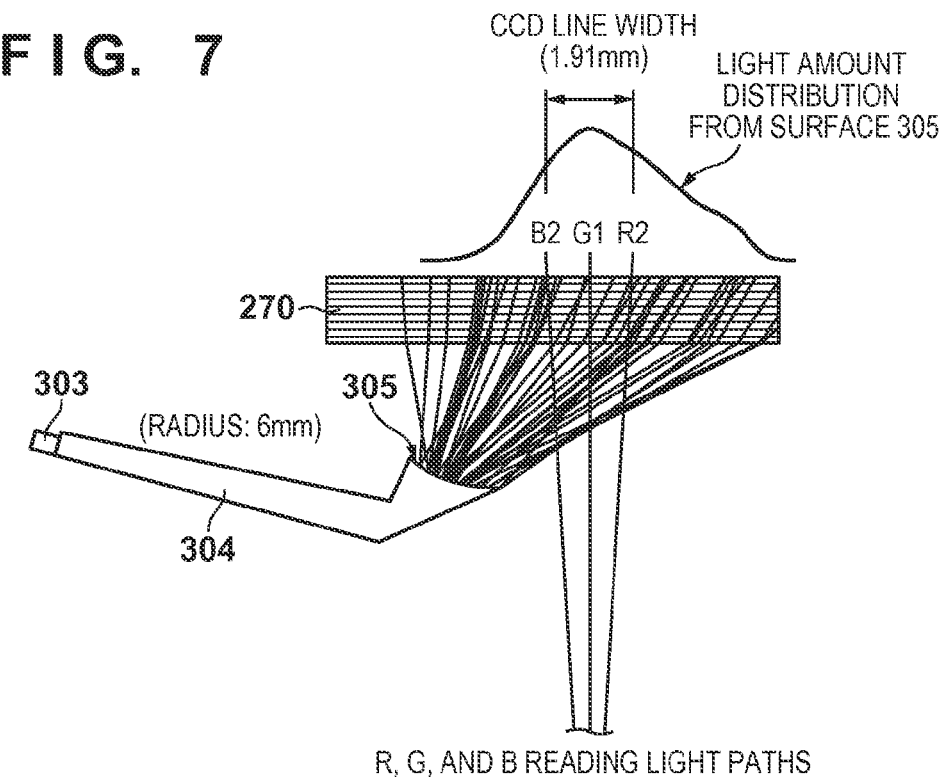

IMAGE READING APPARATUS AND MULTIFUNCTION PRINTING APPARATUS

BACKGROUND OF THE INVENTION

1. Field of the Invention

The present invention relates to an image reading apparatus and multifunction printing apparatus and, particularly, to an image reading apparatus and multifunction printing apparatus which optically read an image original by using a white LED.

2. Description of the Related Art

There has conventionally been known a scanner apparatus which optically reads an image.

FIG. 9 is a side sectional view showing the arrangement of the optical unit of a conventional scanner apparatus. When reading an image, light which has been emitted by an LED 15 serving as a light source and passed through a light guide 1 irradiates an original image through a platen glass 8, as shown in FIG. 9. The light reflected by the original image forms an image through an imaging optical system formed from reflecting mirrors 2, 3, 4, and 5 and a condenser lens 6. The image forming light is converted into an electrical signal by using a CCD 7.

In early scanner apparatuses, one beam was separated into three components by using a prism for color separation when reading a color image. Thus, the R, G, and B color components were read at one portion. However, such a scanner apparatus using the prism required three or more CCDs, and the number of components increased along with this. The CCD positions for reading the R, G, and B color components needed to be adjusted, and it was very difficult to adjust them. Further, the prism was expensive and raised the cost.

To solve these problems, a scanner apparatus using a 3-line CCD has been proposed. However, in the scanner apparatus using the 3-line CCD, the reading positions of the R, G, and B color components shift in the sub-scanning direction.

FIG. 10 is a view schematically showing dispersion of light in a scanner apparatus using a 3-line CCD. As shown in FIG. 10, reading positions for light emitted by the LED 15 through the light guide 1 shift in correspondence with the R, G, and B color components in the sub-scanning direction on an image original (not shown) placed on the platen glass 8.

Recently, thanks to technological development, the LED luminous efficiency has been improved close to the luminous efficiency of a CCFL (Cold Cathode Fluorescent Lamp) conventionally used as the light source of the scanner apparatus. This light source is being replaced with a mercury-free LED. For example, Japanese Patent Laid-Open No. 1-181377 discloses an LED illumination device which separately illuminates the reading positions of three lines in order to cope with a 3-line color CCD. Japanese Patent No. 3,217,879 discloses a method of obtaining a uniform illumination light amount as a whole by condensing light from a columnar lamp to different locations in the vertical direction on a reflection board. Further, Japanese Patent Laid-Open No. 2008-123766 discloses the shape of a light guide which efficiently guides light from a white LED onto a platen glass surface.

In a case where the 3-line CCD is used, the R, G, and B reading positions shift in the sub-scanning direction, as described above, so the illumination device needs to uniformly irradiate the reading width. For example, FIG. 10 shows the width as a CCD line width. If this width cannot be illuminated uniformly, reading outputs from the respective lines of the CCD vary, and accumulated charges become insufficient. As a result, noise increases or read information becomes incorrect, and the read color changes from the original color.

The emission direction of the conventional scanner apparatus using the CCFL is 360°, the light is not directional, and the light amount distribution width and the like can be adjusted using the reflection board. However, when the light source is replaced with the LED to also stop the use of mercury, LED emission has high directionality. That is, not the entire light source emits light, but only one small emission surface substantially emits light of a spot shape, unlike the CCFL. It is therefore difficult to adjust the light amount distribution by using the reflection board.

To solve this, in a case where the LED 15 is used as the light source, as shown in FIG. 10, the emission direction and diffused direction of light are controlled using the light guide 1 to obtain a satisfactorily uniform light amount distribution on the platen glass 8. FIG. 10 schematically shows the distribution of the amount of light from a surface 9 of the light guide 1. FIG. 10 shows the result of a ray tracing simulation in which light emitted by the LED 15 propagates through the light guide 1 while being totally reflected, and reaches the upper surface of the platen glass 8.

Recent scanner apparatuses are increasing the resolution, and CCD pixels need to be arranged in the main scanning direction in accordance with the resolution. However, the integration technology has limitations. To cope with a high resolution while keeping the optical unit compact, CCD pixels need to be staggered and arrayed on a plurality of lines in the sub-scanning direction. Hence, the distribution of light needs to uniformly illuminate the respective CCD lines spread in the sub-scanning direction, and read the light.

In short, in a case where the CCD line width is sufficiently small, a uniform light amount distribution is obtained on the platen glass surface by light from the light guide. However, in a case where the CCD line width is large in the sub-scanning direction, the light amount becomes greatly different between the respective color components, as represented by B2, G1, and R1 shown in FIG. 10.

As a countermeasure against this, the arrangement is returned so that one beam is separated into three color components and the R, G, and B color components are read at one portion. In this case, a change of the tint can be suppressed though the image becomes dark. However, this poses the problems of cost and productivity, as described above.

As shown in FIG. 9, light from the light source of a scanner apparatus generally irradiates an image original from only the diagonal direction, while the reading light path of the CCD is vertical. Because of this arrangement, it is very difficult to prevent changes of the light amount and tint in a reading range corresponding to a large CCD line width. For this reason, a method is conceivable, in which the CCFL is used, and positions at different levels are illuminated with two illumination units, as disclosed in Japanese Patent No. 3,217,879. More specifically, two LED boards on each of which about 30 compact LEDs are arranged side by side, and two light guides are provided, and are arranged on one side of the reading unit. This arrangement can be expected to obtain the same effects as those described above. Further, these illumination units are arranged on the two sides of the reading unit and illuminate positions at the same level. This makes at least a change of the light amount distribution bilaterally symmetrical. The output balance between R and B is well-maintained, a change of the tint is greatly reduced, and a uniform illumination effect can also be expected.

In this arrangement, since the light guide is a simple plastic component, even if a plurality of such light guides are used, they hardly influence the cost. However, LEDs and a board on which the LEDs are arrayed are very expensive. In terms of cost, it is hard to employ the arrangement of a plurality of LED boards for a product.

SUMMARY OF THE INVENTION

Accordingly, the present invention is conceived as a response to the above-described disadvantages of the conventional art.

For example, an image reading apparatus and multifunction printing apparatus according to this invention are capable of irradiating the image reading range in an almost uniform light amount and performing high-quality image reading.

According to one aspect of the present invention, there is provided an image reading apparatus. The apparatus comprises: a platen glass on which an original is placed; a white LED; a light guide configured to guide light from the white LED to the platen glass; and a line sensor configured to read a color image of the original illuminated by the light emitted from the white LED through the light guide, wherein a surface of the light guide from which the light emerges is formed into a concave shape, and the light emerging from the surface illuminates a reading region of the original.

According to another aspect of the present invention, there is provided a multifunction printing apparatus (MFP). The MFP comprises: the above mentioned image reading apparatus; and a printing unit configured to print an image on a printing medium based on image data representing an image read by the image reading apparatus, or externally input image data.

The invention is particularly advantageous since the image reading range is irradiated in a uniform light amount, and high-quality image reading can be performed while suppressing a change of the tint even in color image reading.

Further features of the present invention will become apparent from the following description of exemplary embodiments (with reference to the attached drawings).

BRIEF DESCRIPTION OF THE DRAWINGS

FIG. 6 is a sectional view showing the light path of an optical unit 240.

FIG. 7 is a sectional view showing the light path of the optical unit 240.

DESCRIPTION OF THE EMBODIMENTS

Figure 1A:
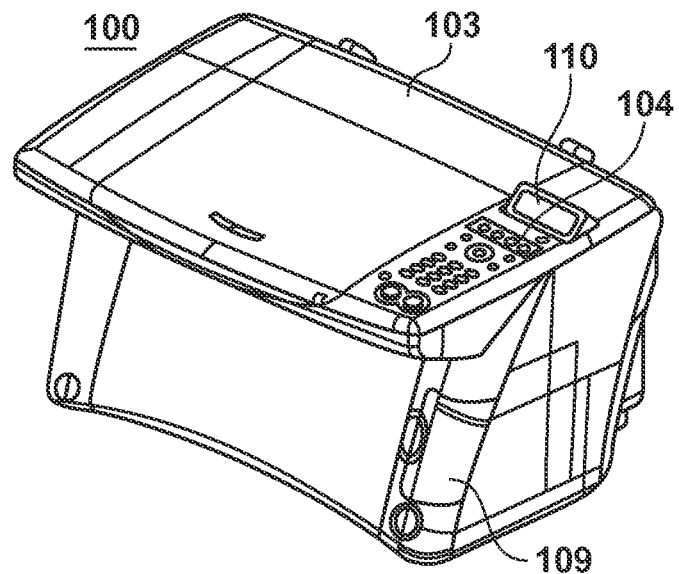
FIGS. 1A and 1B are schematic perspective views showing a multifunction printing (MFP) apparatus as an exemplary typical embodiment of the present invention.

Exemplary embodiments of the present invention will now be described in detail in accordance with the accompanying drawings. Note that the same reference numerals as those described above denote the same parts, and a repetitive description thereof will be omitted.

In this specification, the terms "print" and "printing" not only include the formation of significant information such as characters and graphics, but also broadly includes the formation of images, figures, patterns, and the like on a printing medium, or the processing of the medium, regardless of whether they are significant or insignificant and whether they are so visualized as to be visually perceivable by humans.

First, the arrangement of a multifunction printing apparatus (to be referred to as an MFP apparatus hereinafter) used as a common embodiment will be explained.

<MFP Apparatus>

Figure 1B:
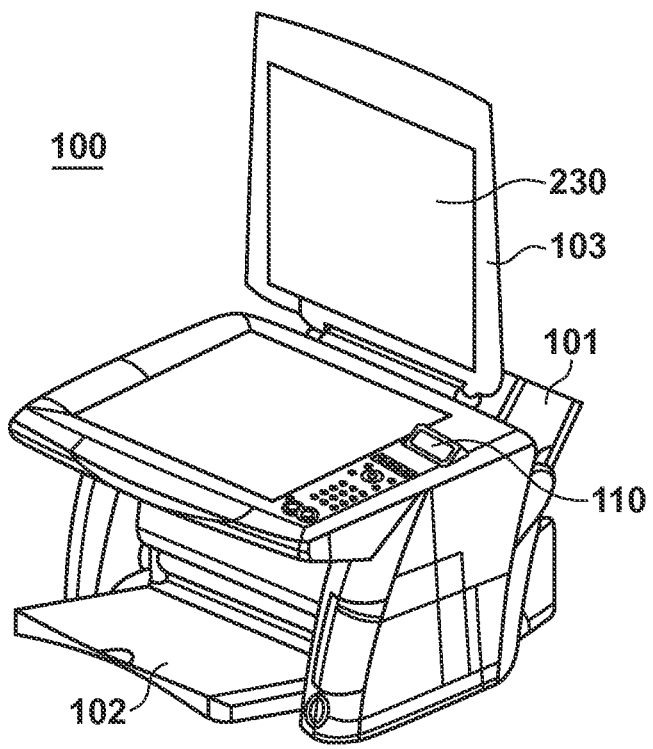

FIGS. 1A and 1B are schematic perspective views showing an MFP apparatus 100 as an exemplary embodiment of the present invention.

The MFP apparatus can print an image on a printing medium such as printing paper based on image data from a connected host (not shown). In addition, the MFP apparatus can perform printing based on image data stored in a memory card or the like, and read and copy an image original.

FIG. 1A shows a state in which an original cover 103 is closed. FIG. 1B shows a state in which a stacking tray 101 and discharge tray 102 for printing media, and the original cover 103 are open.

A reading unit including an optical unit (to be described later) reads an image original, and outputs analog luminance signals of R, G, and B components. A card interface 109 is used to insert a memory card or the like which records an image file captured by, for example, a digital still camera (not shown), and load image data from the memory card in accordance with a predetermined operation on an operation unit 104. The MFP apparatus 100 also includes a display unit such as an LCD 110. The LCD 110 is used to display setting contents and a function selection menu by the operation unit 104.

Figure 2:
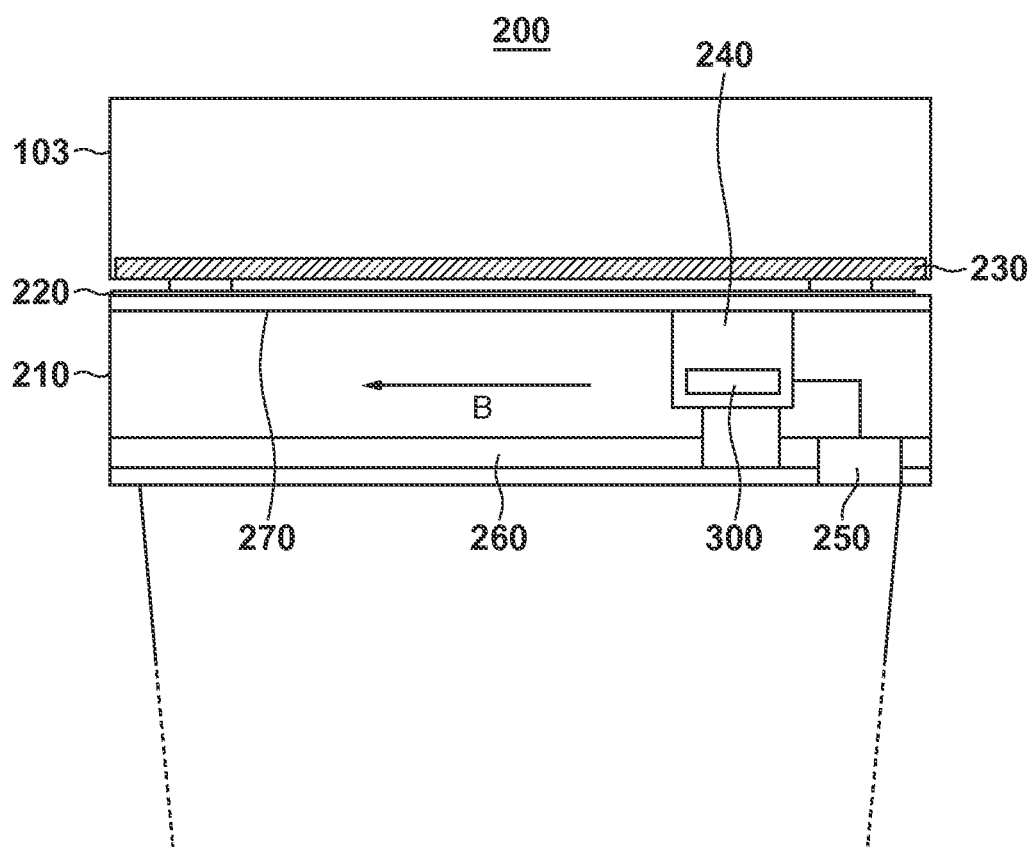
FIG. 2 is a sectional view showing an image reading apparatus installed at the top of the MFP apparatus shown in FIGS. 1A and 1B.

FIG. 2 is a sectional view showing an image reading apparatus (scanner apparatus) installed at the top of the MFP apparatus shown in FIGS. 1A and 1B.

As shown in FIG. 2, an image reading apparatus 200 includes a main body 210, and a pressing plate 230 which presses an original 220 to be read and cuts off external light. The pressing plate 230 is set on the lower surface of the original cover 103. The main body 210 includes an optical unit 240, a circuit board 250 electrically connected to the optical unit 240, a sliding rod 260 serving as a rail when the optical unit 240 is scanned, and a platen glass 270. The optical unit 240 incorporates a 3-line CCD sensor (3-line sensor) 300 serving as a line sensor which irradiates the original 220 with light, receives the reflected light, converts it into an electrical signal, and reads the image for the respective R, G, and B color components. Note that the line sensor is not limited to the CCD type and may be of a CMOS type. When reading an image, the original 220 on the platen glass 270 is scanned by moving the optical unit 240 in a direction (sub-scanning direction) indicated by an arrow B, and reading an image printed on the original 220. In FIG. 2, the main scanning direction is a direction perpendicular to the paper surface.

Figure 3:
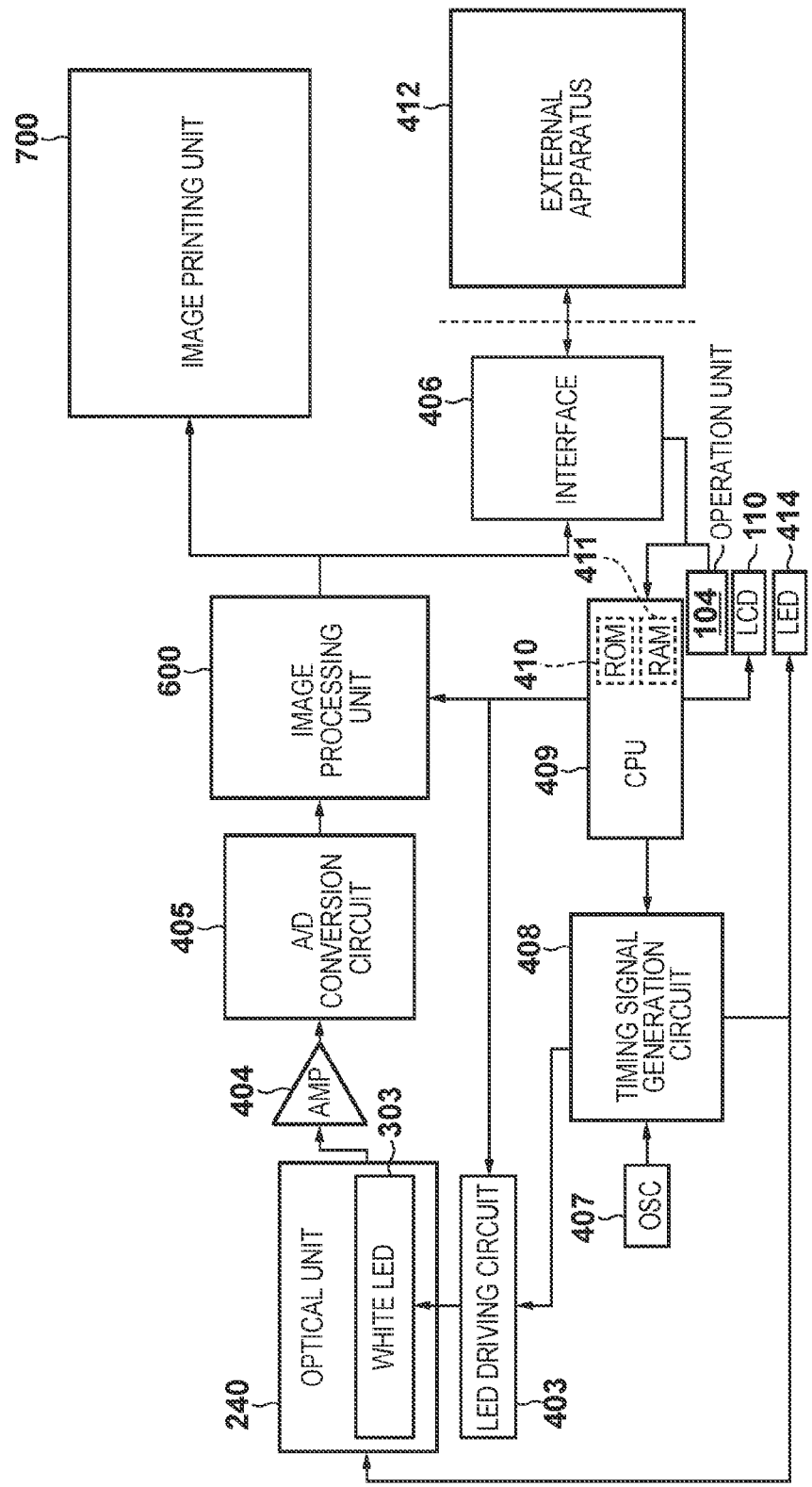
FIG. 3 is a block diagram showing the arrangement of the control circuit of the image reading apparatus.

FIG. 3 is a block diagram showing the arrangement of the control circuit of the image reading apparatus.

In FIG. 3, the same reference numerals as those in FIGS. 1A to 2 denote the same parts, and a description thereof will not be repeated.

The optical unit 240 line-sequentially reads a color image by turning on a white LED 303 for every line by driving control of an LED driving circuit 403.

An amplifier (AMP) 404 amplifies signals of the R, G, and B color components output from the optical unit 240. An A/D conversion circuit 405 A/D-converts the amplified electrical signals, and outputs, for example, digital image data of 16 bits for each color component of each pixel. An image processing unit 600 processes the digital image data converted by the A/D conversion circuit 405. An interface control circuit 406 receives the image data from the image processing unit 600, and performs exchange of control data and output of image data between the interface control circuit 406 and an external apparatus 412. The image data from the image processing unit 600 can also be output to an image printing unit. The external apparatus 412 is, for example, a personal computer (not shown).

A CPU 409 in the form of a microcomputer controls an operation instruction from the operation unit 104. This control is executed by reading out a processing program stored in a ROM 410 by the CPU 409, and executing it by the CPU 409 using a RAM 411 as a work area. In FIG. 3, a reference signal oscillator (OSC) 407 is, for example, a crystal oscillator. A timing signal generation circuit 408 generates various timing signals serving as the basis of the operation by dividing an output from the reference signal oscillator (OSC) 407 in accordance with the setting of the CPU 409.

When the MFP apparatus operates based on an instruction from the personal computer (external apparatus 412), instructions such as copying and image reading (scanning) are issued from the personal computer to the CPU 409. A subsequent operation is the same as that when the MFP apparatus alone performs a copying or image reading (scanning) operation.

An LED 414 is an LED serving as the backlight source of the LCD 110, and its ON operation is controlled by an ON signal output from the timing signal generation circuit 408.

An image printing unit 700 converts image data from the interface control circuit 406 into binary data representing "print" or "not print" for each pixel, and prints an image on a printing medium by using a printing material. The embodiment adopts an inkjet printer as the image printing unit 700. In addition to this, a laser beam printer using a photoelectric method, a sublimation printer, or the like is usable as the image printing unit 700. These printers are well known, and a detailed description thereof will be omitted.

Next, embodiments of the optical unit of the MFP apparatus having the above arrangement will be described in detail.

[First Embodiment]

Figure 4:
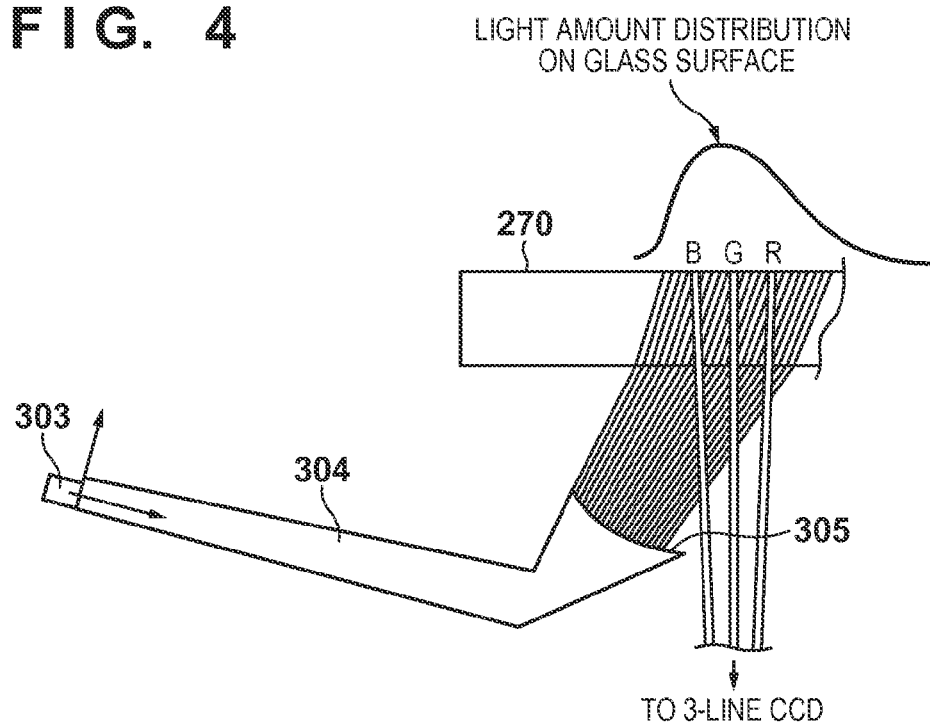
FIG. 4 is a view schematically showing a state in which light emitted by a white LED propagates through a light guide while being totally reflected several times.

FIG. 4 is a view schematically showing a state in which light emitted by a white LED propagates through a light guide while being totally reflected several times.

Figure 9:
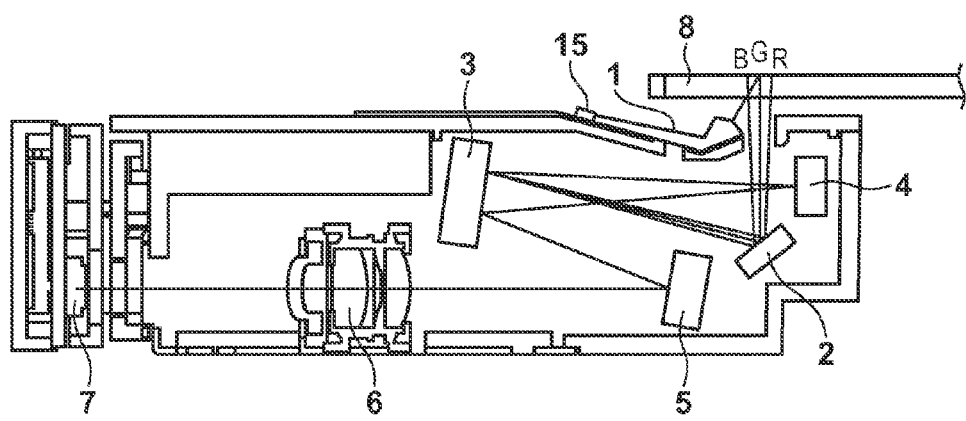
FIG. 9 is a side sectional view showing the arrangement of a conventional scanner apparatus.

As shown in FIG. 4, light emerging from a concave surface 305 of a light guide 304 illuminates an original while being refracted twice by a platen glass 270. Since an optical unit 240 uses a 3-line CCD 300, the reading light paths of the R, G, and B colors are separate light paths. In FIG. 4, three double-lines indicated by R, G, and B represent red (R component), green (G component), and blue (B component) reading light paths. Beams on the three light paths propagate while repeating reflection by a plurality of reflecting mirrors 2, 3, 4, and 5 as shown in FIG. 9, and reach a lens unit 6. The beams having passed through the lens unit 6 form images at red (R), green (G), and blue (B) sensors in the 3-line CCD 300.

As shown in FIG. 4, the light amount distribution of light emerging from the surface 305 of the light guide 304 is designed to have a good balance between the reading light paths R, G, and B on the upper surface of the platen glass 270. Therefore, light from the white LED 303 can illuminate an original very efficiently. The luminous efficiency of the white LED 303 is exceeding a CCFL luminous efficiency of 100 lm/W. However, the cost of the white LED 303 is several times higher than that of the CCFL, so the light from the white LED 303 should not be wasted. The light guide 304 is an optimum mechanism for meeting this requirement.

Figure 5:
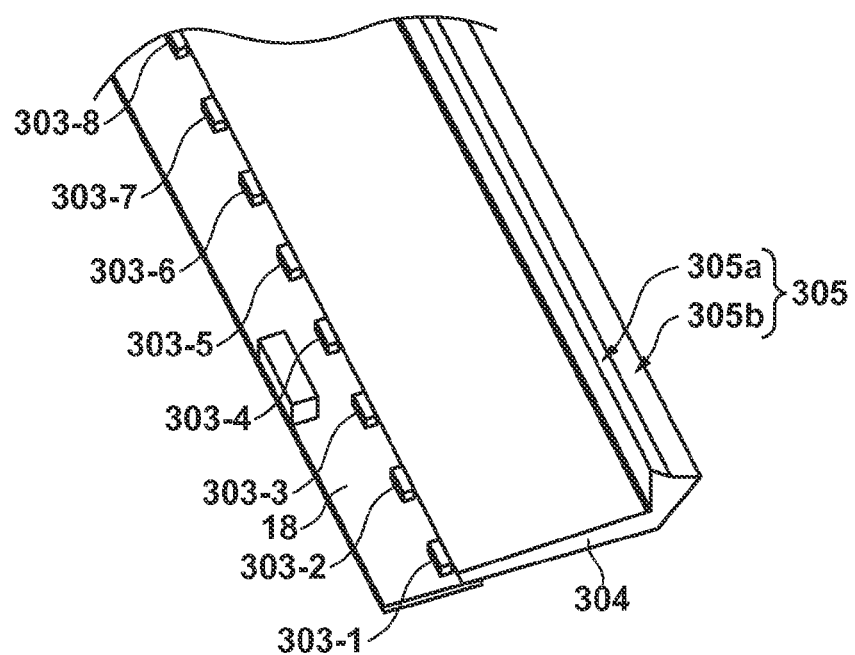
FIG. 5 is a perspective view for explaining the arrangement of the light guide.

FIG. 5 is a perspective view for explaining the arrangement of the light guide 304.

In the example of FIG. 5, the white LED 303 is constructed by a plurality of white LED chips 303-1 to 303-8. Although not shown, the optical unit 240 illuminates a 216-mm wide original by using a total of 24 white LEDs. These white LED chips are integrated on a flexible printed board 18. The white LED 303 has high luminous efficiency, but needs to be integrated on a low-profile printed board having high heat radiation efficiency. However, the flexible printed board is very expensive, and the area to use it needs to be minimized. Compared to the flexible printed board, the light guide 304 is less expensive. Increasing the number of light guides hardly influences the cost though the area of the flexible printed board 18 needs to be suppressed.

The cost of the flexible printed board 18 is proportional to the area. As long as the area is the same, even if the flexible printed board is divided into two, the cost does not change. Hence, the flexible printed board can be divided at the center in the longitudinal direction within one plane to arrange the two half-length boards side by side, as a matter of course.

In any case, the embodiment uses the light guide capable of illuminating a wide reading region on the original surface almost uniformly without increasing the number of printed boards on which LEDs are integrated.

Figure 10:
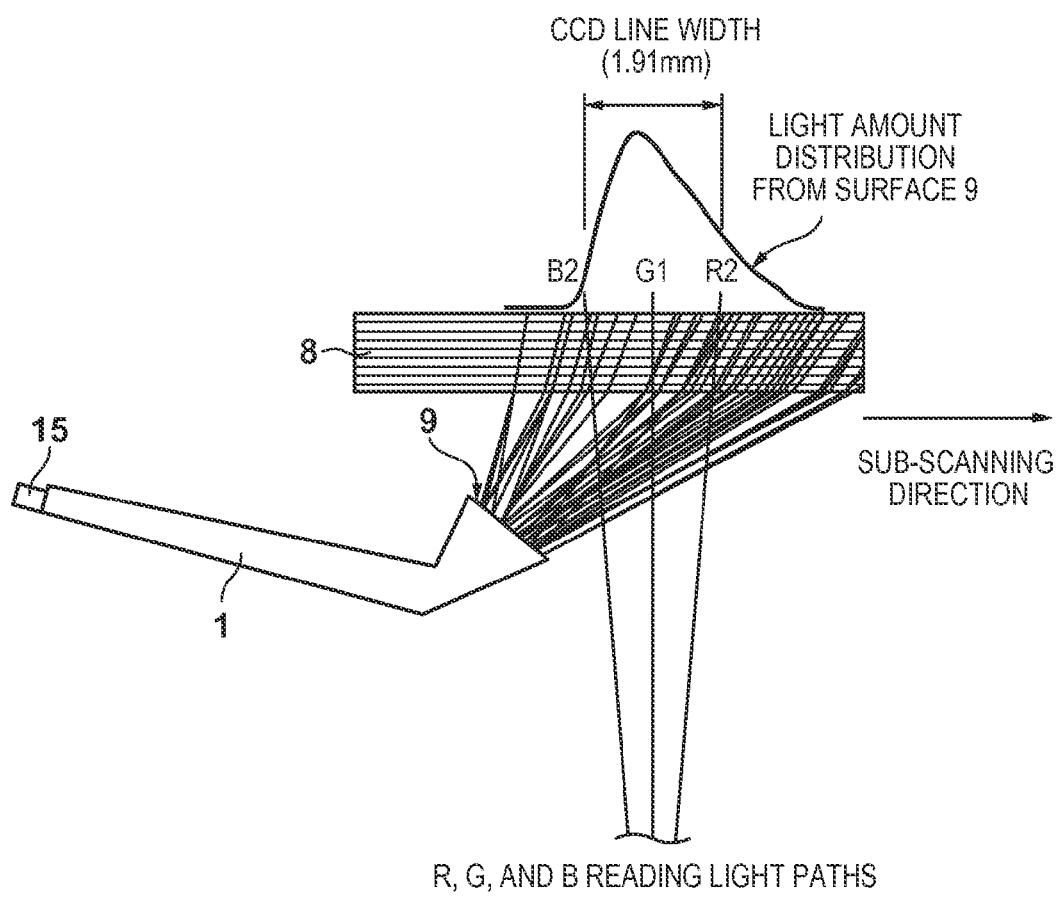
FIG. 10 is a view showing a tracing simulation of a ray through a light guide in the conventional scanner apparatus.

Further, as is apparent from FIG. 5, the surface 305 of the light guide 304 is constituted by two surfaces 305a and 305b, and these two surfaces form a concave shape. By employing this shape as the surface, the light condensing characteristic changes and the light amount distribution changes, unlike the surface (flat surface) of a conventional light guide as shown in FIG. 10. Note that each of the two surfaces may be flat or curved. In any case, the concave surface is formed.

FIG. 6 is a sectional view showing the light path of the optical unit 240.

As shown in FIG. 6, light emitted by the white LED 303 propagates through the light guide 304 while being totally reflected, and emerges from the surface 305. The light emerging from the surface 305 propagates while being refracted twice by the platen glass 270. In this example, the light amount distribution on the surface of the platen glass 270 is optimized to be almost uniform for R, G, and B reading light paths R1, G1, and B1 over a CCD line width (reading region) of 0.67 mm. The image original is therefore illuminated by the optimum light amount distribution.

FIG. 7 is a sectional view showing the light path of the optical unit 240.

In the example shown in FIG. 7, the CCD line width is 1.91 mm, and the reading light path is wider than that in the example shown in FIG. 6. As shown in FIG. 7, the light amount distribution on the surface of the platen glass 270 is optimized to be almost uniform for R, G, and B reading light paths R2, G1, and B2 over the CCD line width of 1.91 mm.

As is apparent from FIGS. 6 and 7, a uniform light amount can be obtained on the platen glass 270 regardless of whether the CCD line width is small or large.

According to the above-described embodiment, since the surface from which light through the light guide emerges is formed into the concave shape, a uniform light amount can be obtained for the R, G, and B reading light paths. Further, reading free from a change of the tint can be performed regardless of the CCD line width.

[Second Embodiment]

Figure 8:
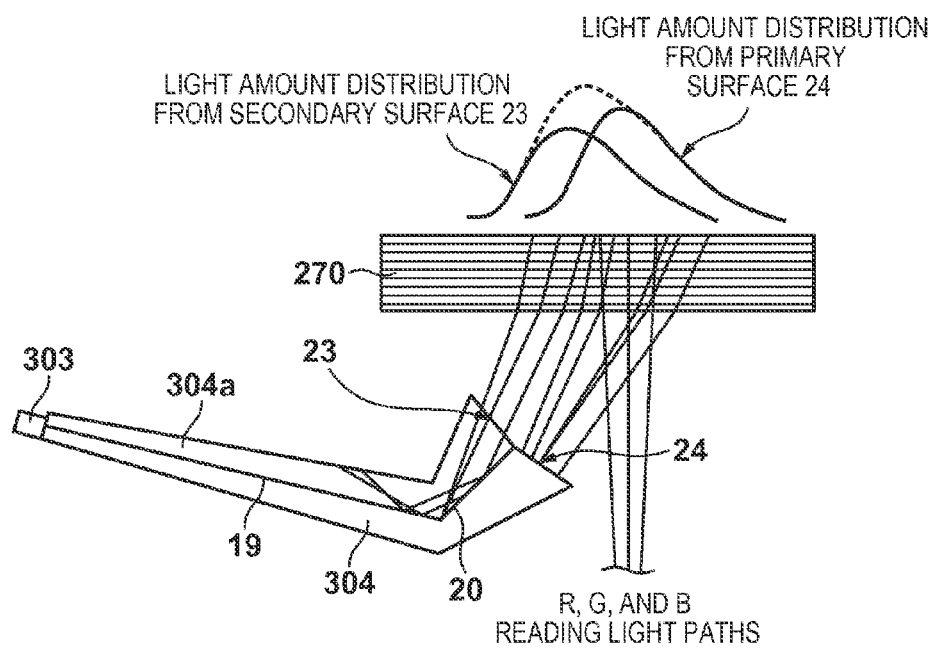
FIG. 8 is a sectional view showing the light path of an optical unit 240 according to the second embodiment.

FIG. 8 is a sectional view showing the light path of an optical unit 240 according to the second embodiment.

The embodiment employs a light guide (first light guide) 304 having a primary surface 24 of the concave shape. In addition, a light guide (second light guide) 304a having a secondary surface 23 of the concave shape is arranged to be adjacent to the light guide 304. Air gaps 19 and 20 are formed between the two light guides 304 and 304a, and beams entering the respective light guides propagate through them while being totally reflected. Light emitted by the white LED 303 is split for the respective light guides 304 and 304a, and the respective beams enter them.

As in the first embodiment, this arrangement optimizes the light amount distribution of light emerging from the primary surface 24 for the R, G, and B reading light paths just at the surface position of a platen glass 270. Light emerging from the secondary surface 23 similarly propagates while being refracted twice by the platen glass 270. Since most of this light passes outside the reading position on the surface of the platen glass 270, reading is performed substantially by light from the primary surface 24.

With this arrangement, an original which can tightly contact the platen glass 270 is illuminated by an optimum light amount distribution. To the contrary, a light amount distribution at a position 3 mm above the surface of the platen glass 270 is the sum of light emerging from the primary surface 24 and light emerging from the secondary surface 23. In this example, the combined light is optimized for the R, G, and B reading light paths, as indicated by a dotted line in FIG. 8. Hence, reading free from a change of the tint can be performed even for a light path of a large CCD line width on the surface of the platen glass 270.

The above-described embodiment can implement high-quality image reading almost free from an unnatural change of the tint upon reading not only a flat original but also a three dimensional body which cannot tightly contact the platen glass. In addition, even while the LED illumination is used, an image of the same quality as that by a scanner apparatus employing the CCFL can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-117374, filed Jun. 3, 2013, which is hereby incorporated by reference herein in its entirety.

What is claimed is:

1. An image reading apparatus comprising:
   a platen glass on which an original is placed;
   a white LED;
   a light guide configured to guide light from said white LED to said platen glass; and
   a line sensor configured to read a color image of the original illuminated by the light emitted from said white LED through said light guide,
   wherein a surface of said light guide from which the light emerges is formed into a concave shape by a plurality of surfaces so as to change a distribution of light emerging therefrom, and the light emerging from the surface illuminates a reading region of the original.

2. The apparatus according to claim 1, wherein each of the plurality of surfaces is one of a flat surface and a curved surface.

3. The apparatus according to claim 1, wherein
   said light guide includes a first light guide and second light guide which are adjacent to each other,
   an air gap is formed between said first light guide and said second light guide, and
   light from said first light guide and light from said second light guide irradiate different positions of said platen glass.

4. The apparatus according to claim 3, wherein
   an image of an original placed on said platen glass such that the original tightly contacts said platen glass is read by light from said first light guide, and
   an image of an original placed on said platen glass not to tightly contact said platen glass is read by light obtained by combining light from said first light guide and light from said second light guide.

5. The apparatus according to claim 1, wherein said line sensor includes a 3-line sensor configured to read an image for R, G, and B color components.

6. The apparatus according to claim 5, wherein reflected light from the reading region is split into light paths for reading the R, G, and B color components to receive the reflected light by said 3-line sensor.

7. The apparatus according to claim 6, wherein light emerging from said light guide exhibits an almost uniform light amount distribution for the R, G, and B color components on said platen glass, and the almost uniform light amount distribution covers a reading line width of said 3-line sensor.

8. A multifunction printing apparatus comprising:
   an image reading apparatus according to claim 1; and
   a printing unit configured to print an image on a printing medium based on image data representing an image read by said image reading apparatus, or externally input image data.

9. The apparatus according to claim 8, wherein said printing unit includes an inkjet printer.

* * * * *